(12) United States Patent
Belady et al.

(10) Patent No.: US 9,812,925 B2
(45) Date of Patent: Nov. 7, 2017

(54) CLOSED LOOP DATA CENTER AND ORGANIC LIFE ECOSYSTEM

(71) Applicant: Microsoft Corporation, Redmond, WA (US)

(72) Inventors: Christian L. Belady, Mercer Island, WA (US); Brian Janous, Issiquah, WA (US); Sean James, Olympia, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 344 days.

(21) Appl. No.: 14/335,874

(22) Filed: Jul. 18, 2014

(65) Prior Publication Data

US 2016/0020669 A1    Jan. 21, 2016

(51) Int. Cl.
| | | |
|---|---|---|
| *H01M 8/22* | (2006.01) | |
| *H01M 8/06* | (2016.01) | |
| *H02K 7/18* | (2006.01) | |
| *F03G 7/00* | (2006.01) | |
| *B64G 7/00* | (2006.01) | |

(52) U.S. Cl.
CPC .............. *H02K 7/18* (2013.01); *B64G 7/00* (2013.01); *F03G 7/00* (2013.01)

(58) Field of Classification Search
CPC ... H02K 7/18; F03G 7/00; B64G 7/00; H01M 2250/405; H01M 8/0675; H01M 8/22; H01M 8/06
See application file for complete search history.

(56) References Cited

U.S. PATENT DOCUMENTS

| | | | | |
|---|---|---|---|---|
| 6,205,704 B1 * | 3/2001 | Schmitz | ................... | A01G 9/18 47/17 |
| 8,236,535 B2 * | 8/2012 | Medoff | ................... | C07H 3/02 435/161 |
| 8,716,537 B2 * | 5/2014 | Medoff | ................... | B01J 19/085 204/157.15 |

(Continued)

OTHER PUBLICATIONS

"International Search Report & Written Opinion Issued in PCT Application No. PCT/US2015/040239", dated Oct. 15, 2015, 11 Pages.

(Continued)

*Primary Examiner* — Barbara Gilliam
*Assistant Examiner* — Angela Martin
(74) *Attorney, Agent, or Firm* — The Watson IP Group, PLC; Vladan M. Vasiljevic

(57) ABSTRACT

Processing units and electrical power generation are integrated with a botanical environment to form a closed loop system whereby the outputs of one component serve as the inputs of another. Additionally, humans can be added to the system while maintaining the closed loop nature. Heat generated by the electrical power generation and processing units aids in the growth of botanicals and in the conversion of waste organic materials into both fertilizer and fuel for the electrical power generation. Additionally, carbon dioxide output by the electrical power generation is consumed by the botanicals, which, in turn, output oxygen consumed by the electrical power generation. Water is obtained by passing the exhaust of the electrical power generation across condenser coils, and is utilized for adiabatic cooling, as well as a heat transfer medium. Water is also consumed by the botanicals, aiding their growth.

20 Claims, 4 Drawing Sheets

(56) References Cited

U.S. PATENT DOCUMENTS

| | | | | |
|---|---|---|---|---|
| 2005/0260469 A1* | 11/2005 | Forte | ................ | H01M 8/04022 |
| | | | | 429/414 |
| 2009/0127127 A1* | 5/2009 | Jones | .................... | B01D 53/62 |
| | | | | 205/464 |
| 2012/0003705 A1* | 1/2012 | Jin | ........................ | B01D 53/62 |
| | | | | 435/136 |
| 2014/0030695 A1* | 1/2014 | Smith | ................... | C12M 41/48 |
| | | | | 435/3 |
| 2014/0038070 A1* | 2/2014 | Papile | .................... | H01M 8/22 |
| | | | | 429/410 |
| 2015/0264871 A1* | 9/2015 | Finnerty | ................. | A01G 9/18 |
| | | | | 47/62 A |
| 2016/0030884 A1* | 2/2016 | Wawrousek | .......... | B01D 53/84 |
| | | | | 435/262.5 |

OTHER PUBLICATIONS

"Biosphere 2", Retrieved at: <<https://en.wikipedia.org/w/index.php?title=Biosphere 2&oldid=613364451>>, Published on: Jun. 18, 2014,11 Pages.

"Fast Facts I Biosphere2", Retrieved at: <<http://b2science.org/who/fact>>, Published on: Jun. 18, 2014, 1 Page.

Gitelson, et al., "Creation of Closed Ecological Life Support Systems Results, Critical Problems and Potentials", In Journal of Siberian Federal University, Biology, vol. 1, Issue 1, Jan. 1, 2008, pp. 19-39.

Nelson, et al., "Closed Ecological Systems, Space Life Support and Biospherics", In Handbook of Environmental Engineering, Humana Press, vol. 10: Environmental Biotechnology, Jan. 1, 2010, pp. 517-565.

\* cited by examiner

US 9,812,925 B2

CLOSED LOOP DATA CENTER AND ORGANIC LIFE ECOSYSTEM

BACKGROUND

Computing devices, and, in particular, the processing units of those computing devices, consume energy, typically electrical energy provided by direct current, and generate heat when performing processing. Conventional mechanisms of providing direct-current electrical energy are inefficient and typically generate environmentally damaging waste products such as soot, acid rain, radiation-emitting compounds, and other waste products. Additionally, conventional mechanisms for providing cooling to processing units consume energy to remove the heat generated when such processing units perform processing and exhaust such heat into the environment, or otherwise leave it unused. Mechanisms, such as fuel cells, exist for generating direct-current electrical energy in an efficient manner with less environmentally damaging waste products. Such mechanisms require fuel, or other raw materials, which are consumed to generate the direct-current electrical energy. However, such mechanisms also generate heat, which, again, is typically removed and exhausted into the environment, or otherwise unused, while additional energy is consumed to do so.

SUMMARY

Processing units and electrical power generation, such as by fuel cells, can be integrated with a greenhouse, or other like botanical environment, to form a closed loop system whereby the outputs and waste products of one component can serve as the inputs and raw materials of another component in the closed loop system. Additionally, one or more humans can be added to such a system, providing control for the processing being performed by the processing units, and consuming the result of such processing, while maintaining the closed loop nature of such a system. Heat generated by the electrical power generation, and the processing units, can aid in the growth and development of the botanicals, as well as aiding in the conversion of waste organic materials into both fertilizer and methane, or other like fuel, that can be consumed by the electrical power generation. Additionally, carbon dioxide output by the electrical power generation can be consumed by the botanicals, which can, in turn, output oxygen that can be consumed by the electrical power generation. Water can be obtained by passing the exhaust of the electrical power generation across condenser coils, and can be utilized to provide cooling capability, such as through adiabatic cooling, as well as to provide a more efficient heat transfer medium. Water can also be consumed by the botanicals, thereby aiding their growth.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to processing devices, such as those typically found in server computing devices, as well as to electrical power generating components, such as fuel cells. A closed loop system can be formed by integrating processing units and electrical power generation, such as fuel cells, with a greenhouse, or other like botanical environment. In such a closed loop system, the outputs and waste products of one component can serve as the inputs and raw materials of another component. Additionally, one or more humans can be added to such a system, providing control for the processing being performed by the processing units, and consuming the result of such processing, while maintaining the closed loop nature of such a system. Heat generated by the electrical power generation, and the processing units, can aid in the growth and development of the botanicals, as well as aiding in the conversion of waste organic materials into both fertilizer and methane, or other like fuel that can be consumed by the electrical power generation. Additionally, carbon dioxide output by the electrical power generation can be consumed by the botanicals, which can, in turn, output oxygen that can be consumed by the electrical power generation. Water can be obtained by passing the exhaust of the electrical power generation across condenser coils, and can be utilized to provide cooling capability, such as through adiabatic cooling, as well as to provide a more efficient heat transfer medium. Water can also be consumed by the botanicals, thereby aiding their growth.

The techniques described herein make reference to specific devices or structures, such as fuel cells, racks of server computing devices, liquid cooling, conveyor systems, ductwork and other like specific devices or structures. Such references, however, are strictly exemplary and are made for ease of description and presentation, and are not intended to limit the mechanisms described to the specific environments and computing devices enumerated. In particular, to the extent that alternative devices or structures accomplish the intended and described results, and do so within the confines of the systems described, such alternative devices and structures are equivalents to those described, and are meant to be encompassed by the descriptions herein.

Figure 1:
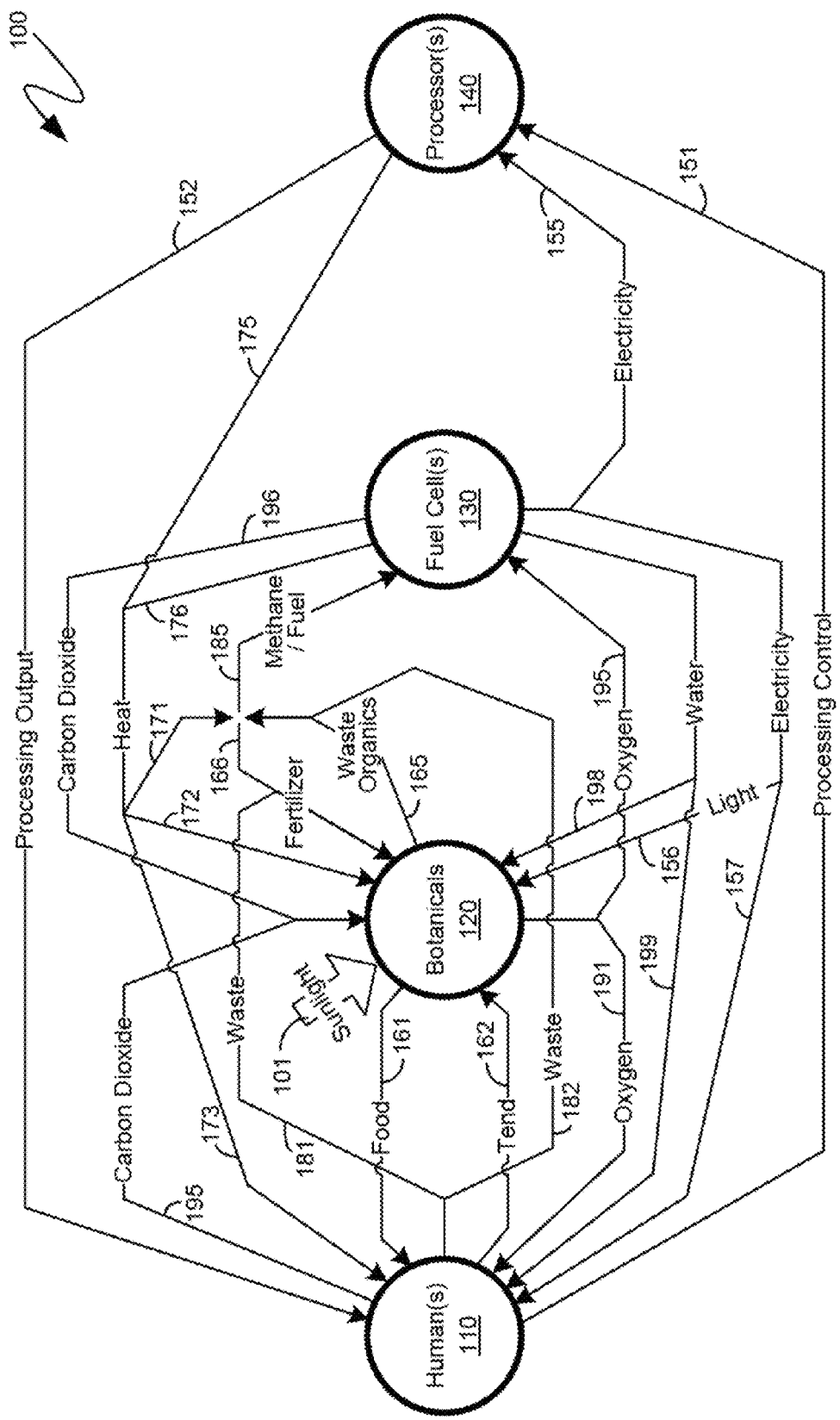
FIG. 1 is a block diagram of an exemplary exchange of raw materials, waste products and outputs in an exemplary closed loop system.

Turning first to FIG. 1, an exemplary system 100 is shown therein, illustrating the closed loop nature of the exemplary system 100, wherein, other than the sunlight 101, the inputs and raw materials, as well as the outputs and waste products, of the components of the exemplary system 100 are all generated and consumed within the exemplary system 100. The exemplary system 100 is illustrated as comprising one or more humans 110, one or more botanicals 120, one or more fuel cells 130, and one or more processors 140. As indicated previously, while the exemplary system 100 of FIG. 1 is shown as comprising one or more fuel cells 130, other electrical power generation devices, having analogous raw material consumption and waste output, can likewise be utilized. Consequently, reference to the one or more fuel cells 130 is intended to equally encompass reference to such other electrical power generation devices, and is not intended to be limited only to fuel cells. Additionally, as detailed further below, the one or more fuel cells 130 can include fuel cells utilizing different fuel-cell technologies. As also indicated previously, the one or more humans 110 can be an optional component of the exemplary system 100 and, according to one aspect, the exemplary system 100 can remain a closed loop system irrespective of the presence, or absence, of the one or more humans 110 within the exemplary system 100.

Consequently, the exemplary system 100 will be initially described within the context of a closed loop system comprising the botanicals 120, the one or more fuel cells 130 and the one or more processors 140, to the exclusion of the one or more humans 110. The one or more processors 140 can receive electrical power from the one or more fuel cells 130, as illustrated by the path 155 in the exemplary system 100 of FIG. 1. The one or more processors 140 can include processing units, including central processing units (CPUs), graphical processing units (GPUs) and other like processing units. According to one aspect, the one or more processors 140 can be contained within server computing devices, such as blade server computing devices, which can be arranged into racks of such blade server computing devices, both for the physical advantages such arrangements provide, as well as for the financial advantages in utilizing existing and standardized structures and physical embodiments.

Similarly, the one or more fuel cells 130 can be fuel cells that can generate direct current electrical power from methane, natural gas, or other fuel. More specifically, and as will be understood by those skilled in the art, the one or more fuel cells 130 can comprise gas solid oxide fuel cells that can comprise an electrolyte, typically in the form of a solid ceramic material, and an anode and cathode on opposite sides of the electrolyte, each typically comprised of an ink coating on the electrolyte. Such a fuel cell can accept natural gas, such as methane, as input and, inside of the fuel cell, the natural gas can be mixed with water steam to form a "reformed fuel". This reformed fuel enters the anode side of the electrolyte and as it crosses the anode it attracts oxygen ions from the cathode, which are attracted into the cathode from the hot air that is fed to the fuel cell. The oxygen ions combine with the reformed fuel in the electrolyte to produce electricity, water, and small amounts of carbon dioxide, as well as heat. The heat and water can then be utilized to continue the process, thereby enabling the fuel cell to continue to produce direct-current electricity so long as natural gas remains available to it.

Typically, a fuel cell can achieve efficiency ratings of approximately 60% as opposed to, for example, efficiency ratings of thirty-to-forty percent for conventional turbines that generate alternating electrical current. More colloquially, a fuel cell can be almost twice as efficient as conventional electricity generating turbines. Additionally, and as evidenced by the detailed description provided above, a fuel cell typically lacks moving parts, except for fans. Such lack of moving parts can make fuel cells more reliable and less prone to mechanical failures. Fuel cells can also be designed to output electrical power in the form of direct current electricity at 380 VDC. As will be recognized by those skilled in the art, 380 VDC is typically the native voltage of the data processing circuitry utilized by server computing devices, such as those typically found in data centers. Thus, according to one aspect, rather than utilizing existing server computing devices, which can comprise power supplies to transform alternating current electrical power into, typically, 380 volt direct current electrical power, such power supplies can be eliminated in the link between the one or more fuel cells 130 and the one or more processors 140. Some data processing circuitry such as, for example, network switch and router circuitry, may only accept lower voltages such as, for example, 48 VDC. In such instances, mechanisms can be provided to lower the voltage of the DC power being output by the one or more fuel cells 130 to that which can be accepted by such switch and router data processing circuitry.

While the above description was provided within the context of fuel cells, any technology for generating electrical power from power-generation-capable raw materials can be utilized including, for example, gas turbines, steam turbines, reciprocating engines, and other like electrical power generating components.

Turning back to the exemplary system 100 of FIG. 1, the one or more fuel cells 130 can output electricity, not only to the one or more processors 140, but also to aid the growth of the botanicals 120. More specifically, and as illustrated by the path 156, the production of electricity, by the one or more fuel cells 130, can be utilized to generate light, which can aid the growth of the botanicals 120, such as by providing a light source during nighttime hours, or during other periods when the sunlight 101 may not be available to the botanicals 120. Often, the ability of the one or more fuel cells 130 to generate electricity can be specifically designed to be greater than the needs of the one or more processors 140, thereby providing a safety buffer or other like fault tolerance in the provision of such electricity. Such excess electricity can be utilized to generate light to aid the growth of the botanicals 120. To the extent that the quantity of such excess electricity decreases, such as during periods of increased processing, the resulting temporary outages in the provision of light to the botanicals 120 can be of insufficient duration to negatively impact the growth of such botanicals 120. Consequently, botanicals 120 can benefit from light generated from excess electrical generation capacity of the one or more fuel cells 130 even if the provision of such light is occasionally interrupted.

In addition to electricity, the one or more fuel cells 130 can generate exhaust that can comprise carbon dioxide and water vapor. As will be described in detail below, condenser mechanisms can be utilized to derive water from the water vapor present in the exhaust of the one or more fuel cells 130. As to the carbon dioxide component of the exhaust of the one or more fuel cells 130, such carbon dioxide can be consumed by the botanicals 120, as illustrated by the path 196. More specifically, the carbon dioxide produced by fuel cells can be pure and clean, thereby enabling the botanicals 120 to accept and consume such carbon dioxide without negatively impacting the cleanliness and, more specifically, the edibility, of the botanicals 120. The carbon dioxide produced by the one or more fuel cells 130 can, in addition, be elevated in both temperature and humidity, which can further aid its absorption, and utilization, by the botanicals 120.

The water generated from the exhaust of the one or more fuel cells 130 can be, similarly, provided to the botanicals 120, as illustrated by the path 198, to aid in the growing of such botanicals 120. More specifically, a condenser mechanism can be connected to the one or more fuel cells 130 and the exhaust of those fuel cells can then be passed through such a condenser and then exhausted. The condenser mechanism can be designed to cool the exhaust to a temperature approaching the ambient temperature of the air. The dew point of the heated exhaust can be higher than the ambient temperature of the air. Consequently, when the condenser cools the exhaust to a temperature approaching the ambient temperature of the air, the water vapor present in the exhaust can condense out as water condensate. The water condensate can be collected and directed to one or more water storage units, from which it can be utilized. One such utilization can be to water the botanicals 120, as illustrated by the path 198.

Both the one or more fuel cells 130 and the one or more processors 140 can generate heat that can be useful for the botanicals 120. The heat generated by the one or more processors 140 can be a low level, or low temperature, heat compared to the heat generated by the one or more fuel cells 130, which can be a high level, or high temperature, heat. Such heat can be captured and utilized through a number of different mechanisms, each of which will be described in further detail below. One such mechanism can entail the utilization of liquid cooling mechanisms to cool the one or more fuel cells 130 and the one or more processors 140. The liquid utilized by such liquid cooling mechanisms can absorb the heat generated by the one or more fuel cells 130 and the one or more processors 140, and can then deliver such heat to the botanicals 120. In such an instance, heat can be transferred from the one or more fuel cells 130, the one or more processors 140, or combinations thereof by utilizing the liquid as a heat transfer medium. Another mechanism by which heat from the one or more fuel cells 130, the one or more processors 140, or combinations thereof can be utilized can be a conveyor belt system, or other like mechanical movement mechanism, that can bring elements to which such heat is to be provided to the heat generating components themselves. For example, a conveyor belt system can travel over the top of one or more fuel cells 130, one or more processors 140, or combinations thereof, to move physical matter through a space that is heated as a result of the rising or exhausted heat from the one or more fuel cells 130, the one or more processors 140, or combinations thereof. Yet another mechanism by which the heat from the one or more fuel cells 130, the one or more processors 140, or combinations thereof can be utilized can be a venting system that can capture heated air generated by the one or more fuel cells 130, the one or more processors 140, or combinations thereof and can vent such heated air into a space occupied by the botanicals 120, or other like objects that are to be heated.

Heat produced by either the one or more fuel cells 130 or the one or more processors 140, or combinations thereof, can be advantageously utilized by the botanicals 120, and can otherwise further the closed loop nature of the exemplary system 100. For example, such heat can aid in the growing of the botanicals 120 by maintaining such botanicals at optimal growing temperatures. As another example, heat can be applied to waste organics to encourage the generation of methane, or other fuels, therefrom, which can then be utilized by the one or more fuel cells 130. More specifically, waste organics, such as clippings from the botanicals 120, botanicals that have been uprooted and removed to make room for new botanicals, and other like waste organics can be exposed to microbes that breakdown such waste organics and, in the process, produce methane gas, or other like biogas, that can then be utilized by the one or more fuel cells 130. Such microbes can be temperature sensitive, such that the addition of heat can aid in their breakdown of the waste organics and, consequently, in their production of methane, or other like biogas. Once such microbes have completed their breakdown of the waste organics, the resulting material can be returned to the botanicals 120 as fertilizer. Alternatively, or in addition, the waste organics, through the application of heat, can be dried to provide combustible materials that can be utilized in other forms of electrical power generation, which can take the place of the one or more fuel cells 130 or act as alternatives or supplements thereto.

With reference to the exemplary system 100 of FIG. 1, paths 175 and 176 illustrate the provision of heat from the one or more processors 140 and the one or more fuel cells 130, respectively, while the continuing path 172 illustrates the provision of such heat to the botanicals 120, such as to maintain optimal growing temperatures, and otherwise aid the botanicals 120. Similarly, the path 171 illustrates the application of heat to waste organics produced, or obtained, from the botanicals 120, as illustrated by the path 165. The resulting products can then be returned to the botanicals 120 to be utilized as fertilizer, as illustrated by the path 166, while the methane, or other like fuel, whose production was encouraged by the application of heat, illustrated by the path 171, can be provided to the one or more fuel cells 130, as illustrated by the path 185.

One output of the botanicals 120, in addition to the botanicals themselves, can be oxygen. Such oxygen can be consumed as a raw material by the one or more fuel cells 130, as illustrated by the path 195. More specifically, and as detailed above, fuel within the fuel cell can attract oxygen ions obtained from the hot air that is fed to the fuel cell. The oxygen ions can combine with the reformed fuel in the electrolyte to produce electricity and the other outputs detailed above. Conversely, the production of oxygen by the botanicals 120 can be from water in accordance with the well-known photosynthesis process that is performed by the botanicals 120. More specifically, the botanicals 120 can consume the water, such as the water provided by the one or more fuel cells 130, as illustrated by the path 198, and energy from the sunlight 101, and, optionally, the light provided by the electricity generated by the one or more fuel cells 130, as illustrated by the path 156, and the botanicals can utilize such energy to convert such water into oxygen, and derive therefrom compounds beneficial to the botanicals themselves. The resulting oxygen, however, can be exhausted by the botanicals, which can then, in turn, be provided to the one or more fuel cells 130, as illustrated by the path 195.

As can be seen, therefore, the botanicals 120, the one or more fuel cells 130 and the one or more processors 140 can form a closed loop system where the exhaust, output and waste products of one or more components are consumed as the inputs and raw materials of other components, and vice versa. The closed loop nature of the exemplary system 100 of FIG. 1 can be maintained despite the addition of one or more humans to the exemplary system described in detail above. More specifically, as illustrated by the paths 161 and 162, respectively, the one or more humans 110 can consume food produced by the botanicals 120, and can, in turn, tend to the botanicals 120 to aid the growth thereof, such as by planting the botanicals 120, pruning them, aerating the soil, and other like tending actions. Similarly, with respect to the one or more processors 140, the one or more humans 110 can consume the output of the processing performed by the one or more processors 140, as illustrated by the path 152, and can control the processing performed by the one or more processors 140, as illustrated by the path 151.

In addition to the carbon dioxide that is provided by the one or more fuel cells 130, the one or more humans 110 can, likewise, provide carbon dioxide, with each exhaling breath, to the botanicals 120. The provision of carbon dioxide, from the humans 110, to the botanicals 120, is illustrated by the path 195 in FIG. 1. In an analogous manner, the oxygen provided by the botanicals 120 can be consumed by the fuel cells 130, such as was detailed above, and can also be consumed by the one or more humans 110, with each inhaling breath, as illustrated by the path 191 in FIG. 1.

Like the botanicals 120, the one or more humans 110 can utilize the heat provided by the one or more fuel cells 130, the one or more processors 140, or combinations thereof, as illustrated by the path 173. More specifically, the heat can be utilized to maintain a hospitable and comfortable temperature in a space within which the one or more humans 110 live or work. Similarly, like the botanicals 120, the one or more humans 110 can utilize the water and electricity provided by the one or more fuel cells 130, as illustrated by the paths 199 and 157, respectively. Such electricity can be utilized, by the one or more humans 110, to power electrical devices, including electrical devices that maintain hospitable environmental conditions and provide light, while water can be utilized both for human consumption and for cleaning and bathing.

The waste products generated by the one or more humans 110, such as human excrement, can be provided as fertilizer for the botanicals 120, as illustrated by the path 181. Alternatively, or in addition, such waste products can also be treated in the same manner as the waste organics 165, as illustrated by the path 182. More specifically, the application of heat can aid in the generation of methane, or an other like fuel, which can be consumed by the fuel cells 130, from the waste 182 generated by the one or more humans 110. The resulting products can be provided to the botanicals 120 as fertilizer, as detailed above.

Figure 2:
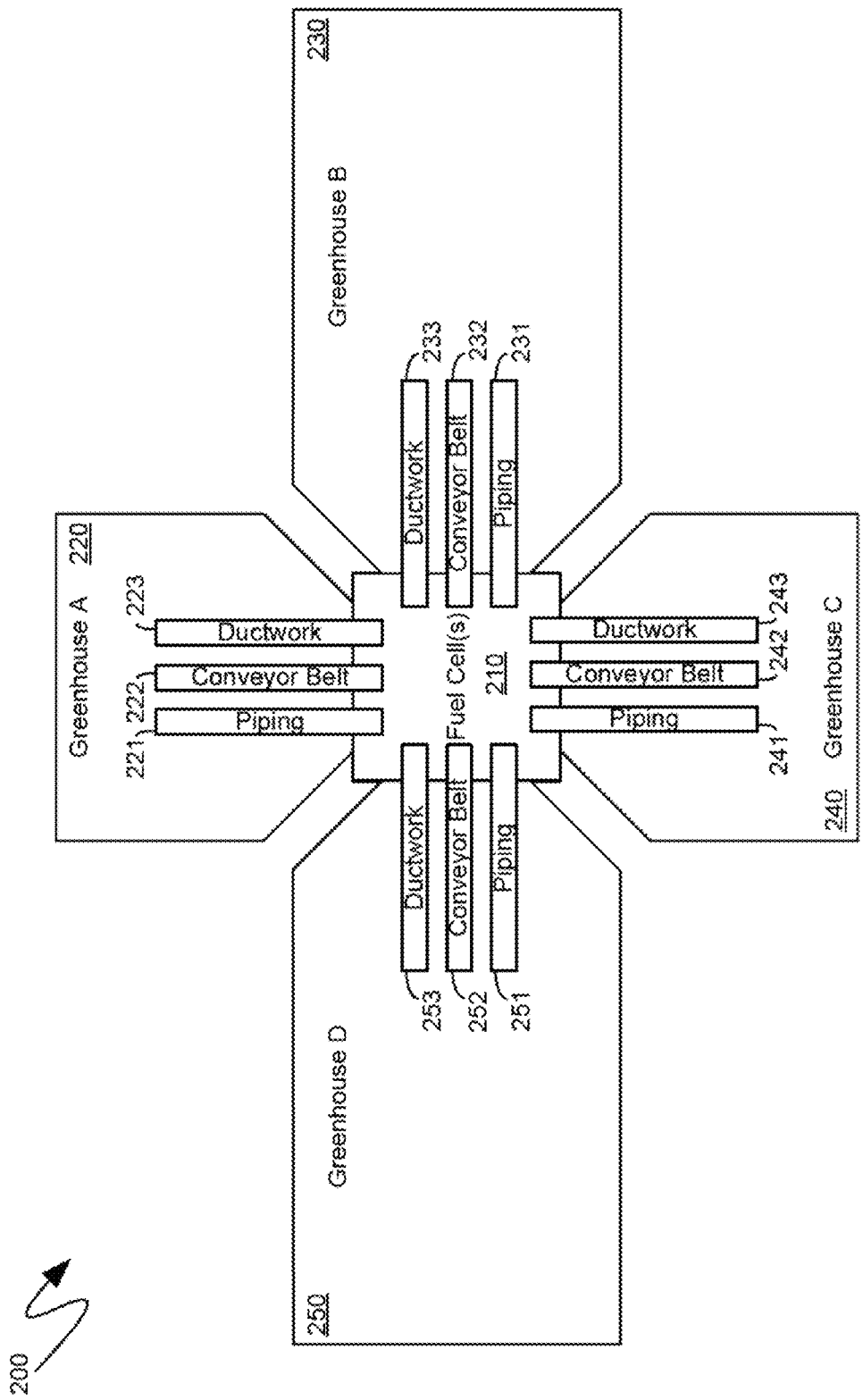
FIG. 2 is a block diagram of an exemplary arrangement of components in an exemplary closed loop system.

Turning to FIG. 2, an exemplary physical layout 200 of a closed loop system is illustrated by the exemplary one or more fuel cells 210 in combination with the exemplary greenhouses, such as the exemplary greenhouses 220, 230, 240 and 250, which can house the botanicals described in detail above. The exemplary physical layout 200 centers the one or more fuel cells 210, with one or more greenhouses arranged around them to facilitate the exchange of raw materials and waste products, inputs and outputs, as detailed above. For example, duct work, piping, conveyor belts, and combinations thereof can, as will be detailed below, exchange raw materials, waste products, and other like inputs and outputs between the one or more fuel cells 210 and the botanicals in the exemplary greenhouses 220, 230, 240 and 250. According to one aspect, each of the exemplary greenhouses 220, 230, 240 and 250 can be physically distinct from one another so that any failure or contamination in one such greenhouse can be contained and not spread to the other greenhouses, thereby providing fault tolerance and resiliency. Consequently, separate sets of ductwork, conveyor belts, piping, or combinations thereof, can separately interface with the one or more fuel cells 210 and each of the exemplary greenhouses 220, 230, 240 and 250, as illustrated by the ductwork 223, conveyor belt 222 and piping 221 interfacing the one or more fuel cells 210 with the exemplary greenhouse 220; the ductwork 233, conveyor belt 232 and piping 231 interfacing the one or more fuel cells 210 with the exemplary greenhouse 230; the ductwork 243, conveyor belt 242 and piping 241 interfacing the one or more fuel cells 210 with the exemplary greenhouse 240; and the ductwork 253, conveyor belt 252 and piping 251 interfacing the one or more fuel cells 210 with the exemplary greenhouse 250.

Due to the closed loop nature of the system described herein, the exemplary physical layout 200 need not be limited to structures confined to, or linked to, Earth's ecosystem, or even located on the Earth. For example, the exemplary physical layout 200, or analogs thereof, can be installed on other planets, moons, or other like worlds beyond that of Earth. Similarly, the exemplary physical layout 200, or analogs thereof, can be implemented through individual components of the space station or other like independent structure.

Because electricity can be more easily conveyed then others of the raw materials, inputs, outputs and waste products described, the one or more processing units can be co-located with the one or more fuel cells 210, or they can be located in one or more of the exemplary greenhouses 220, 230, 240 and 250. When co-located with the one or more fuel cells 210, the heat generated by the one or more processing units can be utilized to supplement the heat produced by the one or more fuel cells 210, such as for the above-described heat consuming processes. Conversely, when located within the one or more exemplary greenhouses 220, 230, 240 and 250, the heat generated by the one or more processing units can maintain growing temperatures for the botanicals and can, thereby, be utilized by the botanicals without the need for more complex heat transfer mechanisms other than merely the free flow of ambient air within the one or more greenhouses comprising both the botanicals and the one or more processing units.

The exemplary physical layout 200 that is illustrated in FIG. 2 is merely one exemplary physical layout that can implement the above-described closed loop system. Another exemplary physical layout can be the positioning of greenhouses in concentric circles around one or more fuel cells. Yet another exemplary physical layout can be the co-locating of all of the above-described components of the closed loop system within a single structure. Yet another exemplary physical layout can be the co-locating of some components, such as fuel cells and botanicals into discrete physical structures, such as pods, which can then be distributed for fault tolerance and failure resiliency. In such a physical layout, the one or more processing units can be located in any one or more of such pods, since, as indicated previously, the transmission of electrical power can be more easily accomplished than the exchange of the other raw materials, input, outputs and waste products described.

Figure 3:
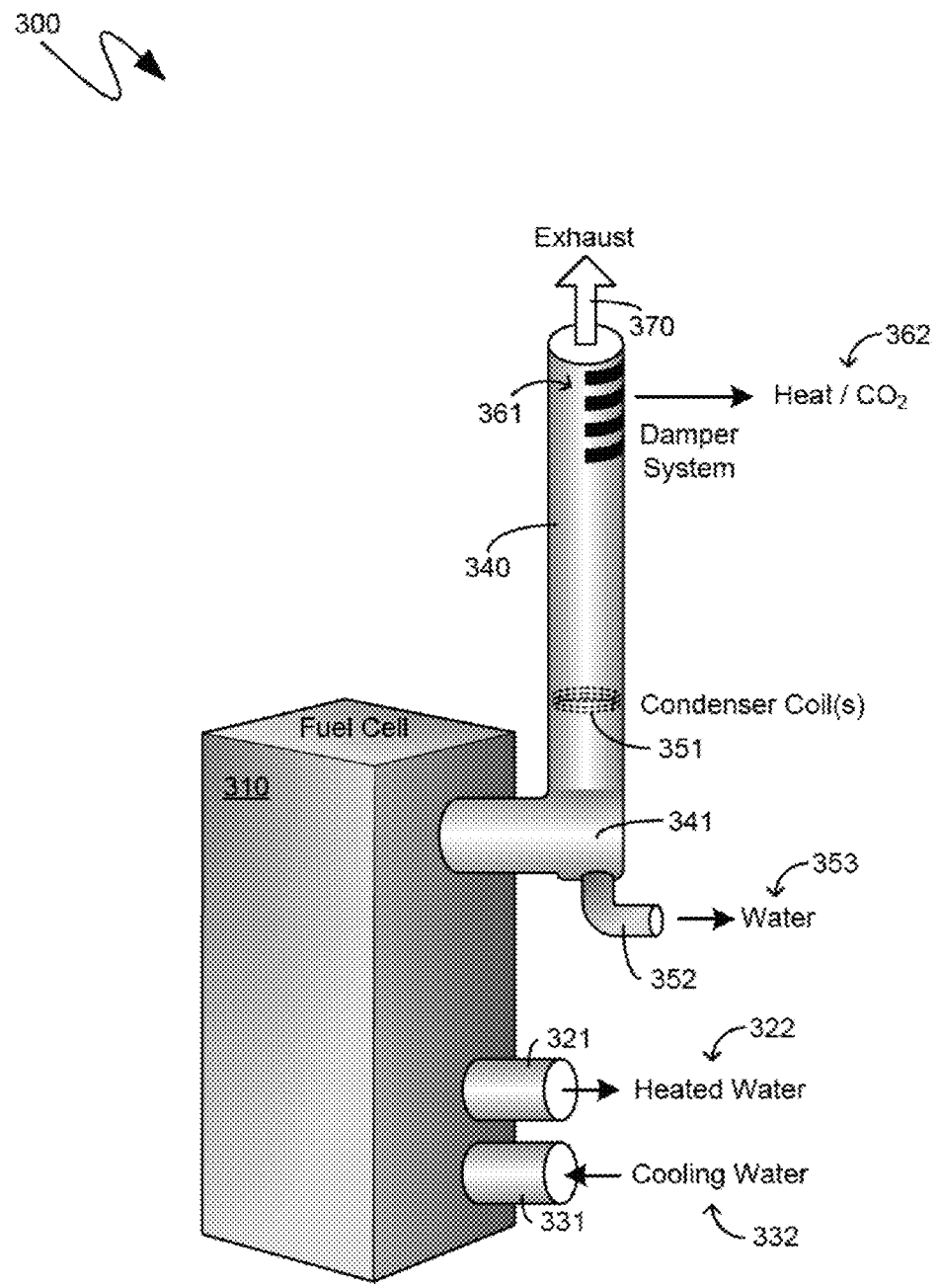
FIG. 3 is a block diagram of exemplary structures for capturing waste products and outputs of a component of an exemplary closed loop system.

Turning to FIG. 3, the exemplary system 300 shown therein illustrates a fuel cell 310 from which at least some of the aforementioned outputs and waste products can be obtained. For example, the exemplary fuel cell 310 of FIG. 3 can comprise outlets and inlets 321 and 331, respectively, through which a liquid, such as water, can be pumped for cooling the fuel cell 310. More specifically, cooling water 332 can be provided to the exemplary fuel cell 310 via the inlet 331. Having absorbed the heat of the fuel cell 310, such water can be exhausted in the form of heated water 322, via the outlet 321. Such heated water 322 can then be utilized as a heat conveyance medium to provide heat to botanicals, or to store heat, such as in water storage tanks, for subsequent utilization. Such water storage tanks can further comprise rocks or other like heat capacitors that can absorb heat during periods of excess heat production, and release heat during periods of reduced heat production and increased heat consumption.

Additionally, the exemplary system 300 of FIG. 3 illustrates an exhaust system 340 through which the exhaust 370 of the exemplary fuel cell can be passed. The exhaust system 340 can comprise condenser coils 351 that can cool the heated exhaust 370 and, thereby, obtain the water 353. More specifically, and as indicated previously, the exhaust 370 of the fuel cell 310 can be at a higher temperature and can have a dew point that is above the temperature of the surrounding air. The condenser coils 351 can maintain a temperature of approximately that of the surrounding air such that, as the exhaust 370 passes over them, it is cooled beyond its dew point, thereby precipitating out water. The exemplary exhaust system 340 can then further comprise a portion 341 into which condensed water can descend down the exhaust system 340 into the portion 341, from which a spigot 352 can enable such water 353 to be collected and utilized, such as the utilizations described in detail above.

The exemplary exhaust system 340 can further comprise a damper system 361 that can provide both heat, in the form of heated air, as well as carbon dioxide vapor, as illustrated by the heat/carbon dioxide provision 362. As detailed previously, the exhaust 370, such as of the exemplary fuel cell 310, can comprise increased concentrations of clean carbon dioxide. The damper system 361 can enable such carbon dioxide rich air to be directed to the botanicals to enable them to utilize the carbon dioxide being emitted by the exemplary fuel cell 310.

Figure 4:
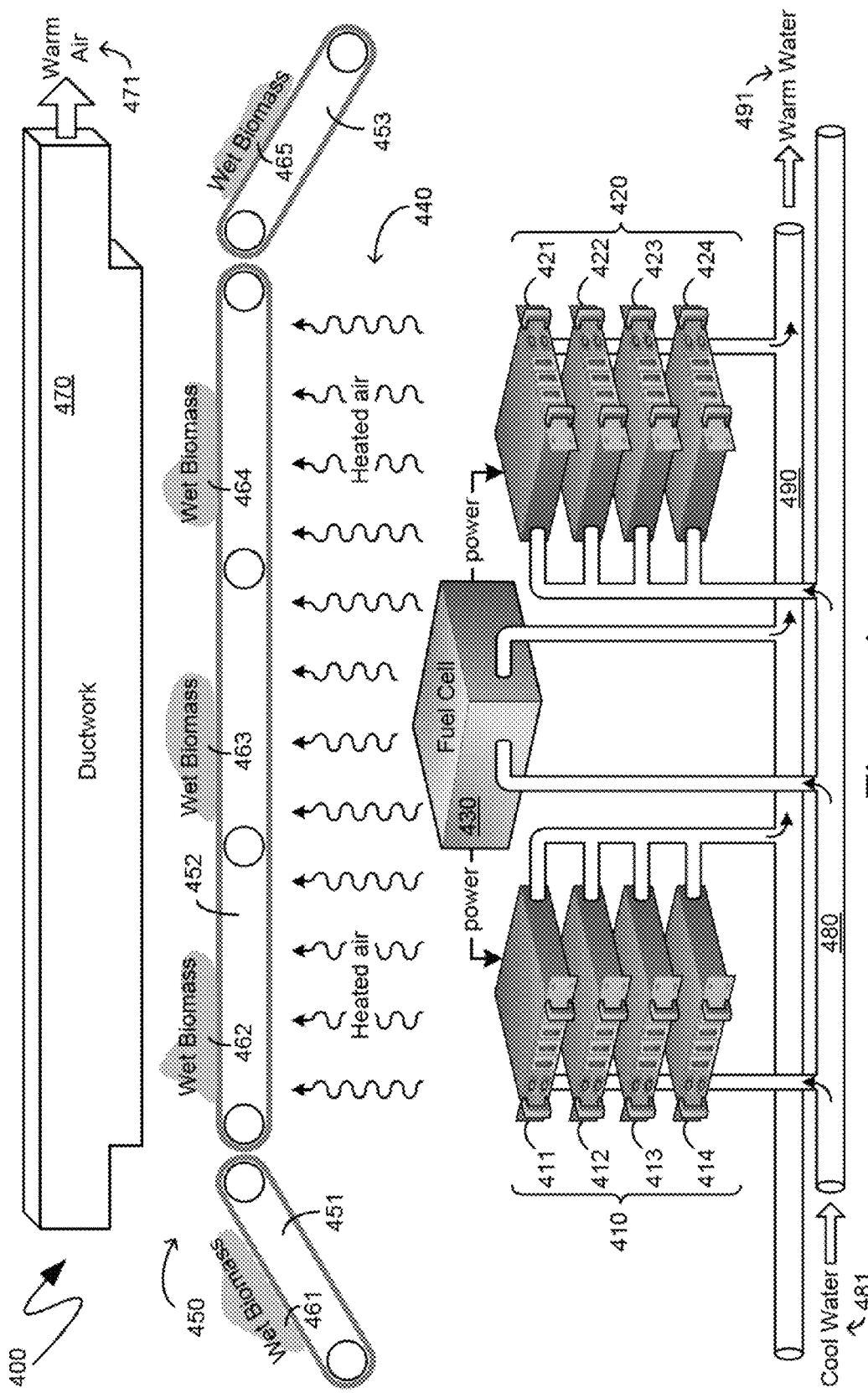
FIG. 4 is a block diagram of exemplary heat transfer structures in exemplary closed loop system.

Turning to FIG. 4, the exemplary system 400 shown therein illustrates an exemplary arrangement of conveyor mechanisms, ductwork and piping that can transport, and otherwise utilize, the heat generated by fuel cells, or other like electrical power generation components, as well as the heat generated by processing units. More specifically, the exemplary system 400 of FIG. 4 can comprise one or more fuel cells, such as the exemplary fuel cell 430, that can provide electrical power to one or more processing units. For purposes of illustration, the one or more processing units are shown as being contained within conventional blade server computing devices, such as the exemplary blade server computing devices 411, 412, 413, 414, 421, 422, 423 and 424, which can be arranged in racks, such as the exemplary racks 410 and 420. The exemplary fuel cell 430 and the exemplary computing devices 411, 412, 413, 414, 421, 422, 423 and 424 can generate heat, as illustrated in exemplary system 400 of FIG. 4 as the rising heated air 440. Additionally, exemplary fuel cell 430 and the exemplary computing devices 411, 412, 413, 414, 421, 422, 423 and 424 can, optionally, be cooled by liquid cooling, such as that provided by the piping 480 and 490, in which case the heat generated by such devices can also be conveyed via the liquid passing through such piping.

Turning first to the liquid cooling, piping, such as the exemplary piping 480, can bring liquid, such as the cool water 481, to the exemplary fuel cell 430 and the exemplary computing devices 411, 412, 413, 414, 421, 422, 423 and 424. Although illustrated as a common pipe 480, separate piping can be utilized to keep separate the liquid used to cool lower heat devices, such as the exemplary computing devices 411, 412, 413, 414, 421, 422, 423 and 424, from the liquid utilized to cool higher heat devices, such as the exemplary fuel cell 430. The liquid can be piped proximate to, or across, various heat generating components, such as the processing units of the exemplary computing devices, 411, 412, 413, 414, 421, 422, 423 and 424. For example, heatsinks with integrated piping can be affixed to the processing units, and the cool water 481 can be pumped through such heatsinks. In absorbing the heat generated by processing units, components of the exemplary fuel cell 430, and other like heat generating components, the liquid can cool such components and can, itself, become warm, as illustrated by the warm water 491. Such warm liquid can transport the heat from the heat generating devices more effectively than, for example, warm air. For example, the warm water 491 can be pumped through piping located in greenhouses and, as such warm water 491 travels through such piping, the heat contained in such water can be released into the surrounding environment, thereby warming it. In such a manner, for example, the ambient temperature of the greenhouse can be maintained to facilitate the growth and development of botanicals.

Another mechanism by which the heat generated by, for example, the exemplary fuel cell 430 and the exemplary computing devices 411, 412, 413, 414, 421, 422, 423 and 424, can be delivered to items to be heated can be to physically convey such items to the source of the heat. Accordingly, exemplary system 400 of FIG. 4 illustrates a conveyor belt system 450, comprising exemplary conveyor belts 451, 452 and 453, that can physically transport items, such as the wet biomass illustrated, to a space in which the heat from the exemplary fuel cell 430 and the exemplary computing devices 411, 412, 413, 414, 421, 422, 423 and 424 is exhausted. The heated air 440, comprising at least some of the heat generated by, and exhausted by, the exemplary fuel cell 430 and the exemplary computing devices 411, 412, 413, 414, 421, 422, 423 and 424 can warm the wet biomass carried along the conveyor belt system 450, such as the exemplary wet biomass 461, 462, 463, 464 and 465. As detailed above, microbes breaking down the waste organics, such as in the form of the exemplary wet biomass 461, 462, 463, 464 and 465, can operate more efficiently in warm environments, such as that provided by the heated air 440. Consequently, the transportation of waste organics by the conveyor belt system 450, through the heated air 440 that is generated by the exemplary fuel cell 430 and the exemplary computing devices 411, 412, 413, 414, 421, 422, 423 and 424, can enable more efficient generation of the byproducts of the breakdown of such waste organics by the microbes including, for example, methane gas, or other like biogas, and compounds which can be utilized as fertilizer for botanicals. As also detailed above, the exemplary wet biomass 461, 462, 463, 464 and 465 can, instead, simply be dried by the heated air 440, enabling such biomass to be more effectively burned. The energy released by such burning can be converted into electrical energy, such as through a steam-powered electrical generator or other like electrical generation mechanism, or can otherwise be advantageously utilized.

Because the items carried by a conveyor belt system, such as exemplary conveyor belt system 450, or other items physically brought into contact with the heated air 440, may not absorb all of the heat available, in one aspect, ductwork, such as the exemplary ductwork 470 can transport the remaining heated air 440, in the form of the warm air 471, to more advantageous locations. For example, the ductwork 470 can utilize blowers to circulate the warm air 471 through one or more greenhouses, thereby maintaining temperatures advantageous for the development of the botanicals in such greenhouses. Ductwork, such as the exemplary ductwork 470, can likewise be utilized to exchange air between an enclosed space comprising the exemplary fuel cell 430 and an enclosed space comprising the botanicals. Such ductwork can facilitate the delivery of oxygen, generated by the botanicals, to the fuel cell 430, and, conversely, to facilitate delivery of carbon dioxide, generated by the exemplary fuel cell 430, to the botanicals.

As detailed above, different components can generate different levels of heat. More specifically, the heat generated by processing components can be of lower temperature than the heat generated by, for example, a fuel cell. Consequently, the utilization of heat can take into account the temperature thereof to more effectively and advantageously utilize such heat. For example, the drying of wet biomass, or other waste organics, need not require the high temperature heat generated by a fuel cell, and can, instead, be equally accomplished through the lower temperature heat generated by processing units. By contrast, the higher temperature heat generated by, for example, a fuel cell, can be utilized to provide adiabatic cooling. More specifically, the high temperature heat generated by a fuel cell can be utilized to raise the temperature of water that can subsequently be provided to an absorption chiller, where such water can be evaporated, with the evaporative process absorbing heat and, thereby, providing cooling functionality. Such cooling can then be utilized to additionally cool heat-generating components, such as the exemplary processing components, especially during periods of high heat, such as during daylight hours, or during periods of increased processing. Another utilization of the intense heat generated by a fuel cell can be for subsequent power generation such as, for example, by steam-driven electrical power generators.

The utilization of heat, whether higher temperature heat, or lower temperature heat, can vary depending upon heating needs, which can be cyclical or unexpected. For example, the high temperature heat generated by, for example, a fuel cell, can be utilized to provide adiabatic cooling, such as detailed above, during daylight hours, but during nighttime hours can be utilized to provide additional warmth to botanicals or humans in the closed loop system.

The descriptions above include, as a first example, a system comprising: one or more electrical generators consuming fuel and oxygen and generating a first heat, electricity, carbon dioxide and water; one or more processing units consuming the electricity generated by the one or more electrical generators and generating processing output and a second heat; and botanicals consuming the water and the carbon dioxide generated by the one or more electrical generators and generating the oxygen consumed by at least some of the one or more electrical generators and waste organics, the botanicals being warmed by one or more of the first heat or the second heat; wherein the fuel consumed by at least some of the one or more electrical generators is produced from one or more of the first heat or the second heat being applied to the waste organics.

A second example is the system of the first example, wherein the system is a closed-loop system receiving only sunlight as external input.

A third example is the system of the first example, further comprising one or more humans providing control to the one or more processing units and tending the botanicals and consuming the processing output generated by the one or more processing units and food generated by the botanicals; wherein the botanicals further generate the food.

A fourth example is the system of the first example, wherein at least some of the one or more electrical generators are fuel cells.

A fifth example is the system of the first example, wherein the fuel is dried waste organics and wherein further the one or more electrical generators produce the electricity by burning the dried waste organics.

A sixth example is the system of the first example, wherein the fuel is biogas produced by operation of microbes consuming the waste organics, the microbes being aided by the application of the first heat or the second heat to the waste organics.

A seventh example is the system of the first example, further comprising piping through which liquid flows, the liquid absorbing at least some of the first heat or at least some of the second heat and providing the absorbed heat to the botanicals.

An eighth example is the system of the first example, further comprising a liquid storage tank for retaining the absorbed heat for subsequent provision.

A ninth example is the system of the first example, further comprising ductwork for delivering, to the botanicals, air heated by at least some of the first heat or at least some of the second heat.

A tenth example is the system of the first example, further comprising a conveyor belt for transporting the waste organics through air heated by at least some of the first heat or at least some of the second heat.

An eleventh example is the system of the first example, further comprising an adiabatic cooler.

A twelfth example is the system of the first example, wherein the one or more electrical generators are physically located in between multiple greenhouses housing the botanicals.

A thirteenth example is the system of the twelfth example, wherein at least some of the multiple greenhouses also house at least some of the one or more processing units.

A fourteenth example is the system of the first example, wherein the one or more processing units are contained within one or more sever computing devices.

A fifteenth example is the system of the first example, wherein the water is generated by cooling an exhaust of at least some of the one or more electrical generators below its dew point.

A sixteenth example is the system of the first example, further comprising electrically-powered light sources, the electrically-powered light sources consuming the electricity generated by the one or more electrical generators and generating light for the botanicals therefrom.

A seventeenth example is a method comprising the steps of: providing electrical power generated by an electrical generator to a processing unit; providing fuel and oxygen generated by botanicals to the electrical generator; providing carbon dioxide and water generated by the electrical generator to the botanicals; providing heat generated by at least one of the processing unit or the electrical generator to the botanicals; and generating the fuel by heating waste organics produced by the botanicals utilizing the heat generated by at least one of the processing unit or the electrical generator.

An eighteenth example is the method of the seventeenth example, further comprising the steps of: providing the oxygen and food generated by the botanicals to a human; providing the water generated by the electrical generator to the human; and providing the heat generated by at least one of the processing unit or the electrical generator to the human.

A nineteenth example is a system comprising: ductwork through which air flows, the air flow providing carbon dioxide generated by an electrical generator to botanicals and providing oxygen generated by the botanicals to the electrical generator; and a heat exchanger transferring heat to the botanicals, the heat being generated by at least one of the electrical generator or a processing unit that consumes electrical power generated by the electrical generator; and a conveyer system physically transporting waste organics that are produced by the botanicals through air heated by heat exhausted by the least one of the electrical generator or the processing unit.

And a twentieth example is the system of the nineteenth example, wherein the heat exchanger comprises piping through which a liquid flows, the liquid absorbing the heat from the least one of the electrical generator or the processing unit, thereby cooling the least one of the electrical generator or the processing unit, and the liquid also delivering the heat to the botanicals.

As can be seen from the above descriptions, closed loop systems comprising processing units, electrical power generation components, botanicals, and, optionally, humans, have been presented. Which, in view of the many possible variations of the subject matter described herein, we claim as our invention all such embodiments as may come within the scope of the following claims and equivalents thereto.

We claim:

1. A system comprising:
   one or more electrical generators consuming fuel and oxygen and generating a first heat, electricity, carbon dioxide and water;
   one or more processing units contained within one or more computing devices, the one or more processing units consuming the electricity generated by the one or more electrical generators and generating processing output and a second heat; and
   botanicals consuming the water and the carbon dioxide generated by the one or more electrical generators and generating the oxygen consumed by at least some of the one or more electrical generators and waste organics, the botanicals being warmed by one or more of the first heat or the second heat;
   wherein the fuel consumed by at least some of the one or more electrical generators is produced from one or more of the first heat or the second heat being applied to the waste organics.

2. The system of claim 1, wherein the system is a closed-loop system receiving only sunlight as external input.

3. The system of claim 1, further comprising one or more humans providing control to the one or more processing units and tending the botanicals and consuming the processing output generated by the one or more processing units and food generated by the botanicals; wherein the botanicals further generate the food.

4. The system of claim 1, wherein at least some of the one or more electrical generators are fuel cells.

5. The system of claim 1, wherein the fuel is dried waste organics and wherein further the one or more electrical generators produce the electricity by burning the dried waste organics.

6. The system of claim 1, wherein the fuel is biogas produced by operation of microbes consuming the waste organics, the microbes being aided by the application of the first heat or the second heat to the waste organics.

7. The system of claim 1, further comprising piping through which liquid flows, the liquid absorbing at least some of the first heat or at least some of the second heat and providing the absorbed heat to the botanicals.

8. The system of claim 1, further comprising a liquid storage tank for retaining the absorbed heat for subsequent provision.

9. The system of claim 1, further comprising ductwork for delivering, to the botanicals, air heated by at least some of the first heat or at least some of the second heat.

10. The system of claim 1, further comprising a conveyor belt for transporting the waste organics through air heated by at least some of the first heat or at least some of the second heat.

11. The system of claim 1, further comprising an adiabatic cooler.

12. The system of claim 1, wherein the one or more electrical generators are physically located in between multiple greenhouses housing the botanicals.

13. The system of claim 12, wherein at least some of the multiple greenhouses also house at least some of the one or more processing units.

14. The system of claim 1, wherein the one or more processing units are contained within one or more server computing devices, wherein the one or more computing devices are server devices.

15. The system of claim 1, wherein the water is generated by cooling an exhaust of at least some of the one or more electrical generators below its dew point.

16. The system of claim 1, further comprising electrically-powered light sources, the electrically-powered light sources consuming the electricity generated by the one or more electrical generators and generating light for the botanicals therefrom.

17. A method comprising the steps of:
    providing electrical power generated by an electrical generator to a processing unit contained within a computing device;
    providing fuel and oxygen generated by botanicals to the electrical generator;
    providing carbon dioxide and water generated by the electrical generator to the botanicals;
    providing heat generated by at least one of the processing unit or the electrical generator to the botanicals; and
    generating the fuel by heating waste organics produced by the botanicals utilizing the heat generated by at least one of the processing unit or the electrical generator.

18. The method of claim 17, further comprising the steps of:
    providing the oxygen and food generated by the botanicals to a human;
    providing the water generated by the electrical generator to the human; and
    providing the heat generated by at least one of the processing unit or the electrical generator to the human.

19. The method of claim 17, wherein the method is performed by a closed-loop system receiving only sunlight as external input.

20. The method of claim 17, wherein the computing device is a server computing device.

* * * * *